Inventors
Philip E. McMorrow
Ralph E. Hobbs, Jr.
By their Attorney

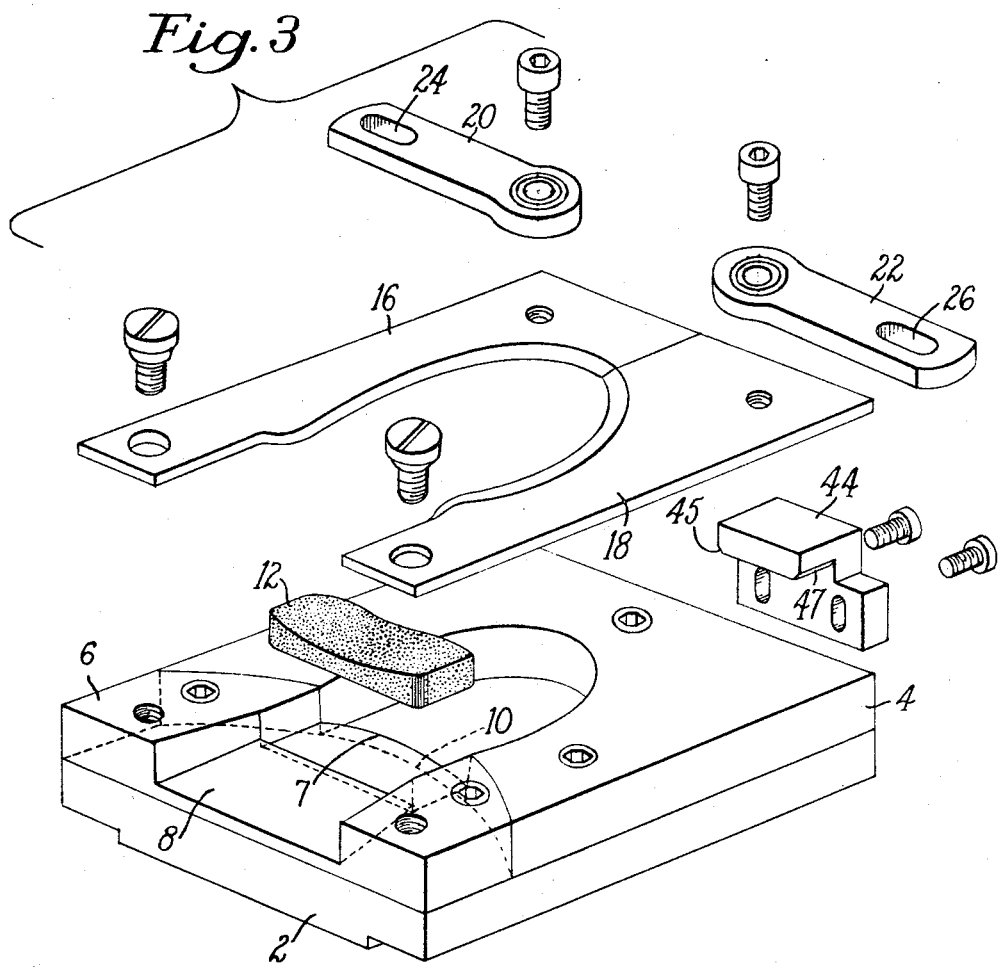

United States Patent Office 3,403,423
Patented Oct. 1, 1968

3,403,423
DIRECT MOLDING OF HEELS TO SOLED
SHOE BOTTOMS
Philip E. McMorrow, Beverly, and Ralph E. Hobbs, Jr.,
Salem, Mass., assignors to United Shoe Machinery Corporation, Flemington, N.J., a corporation of New Jersey
Filed June 7, 1966, Ser. No. 555,722
9 Claims. (Cl. 18—42)

This invention relates to injection molding machines and is directed more particularly to a mold assembly for the molding of heels directly onto soled shoes.

The injection molding of sole and heel units directly onto lasted shoe uppers is well known in the art. Usually, a lasted upper is brought into engagement with a mold assembly to collectively define a sole cavity into which is injected a suitable plastic, such as polyvinylchloride (PVC), in molten form. The mold assembly is permitted to cool, during which time the PVC, or like material, solidifies in the shape of the usual sole and heel and becomes adhered to the upper. When the mold assembly is opened, the upper is removed with the sole and heel attached.

The above-described procedure has realizd substantial economies in shoe manufacture and has been widely utilized. However, there are some objections from the public to all plastic soles. Accordingly, there has developed the practice of incorporating leather or rubber tread pieces in the mold cavity which are molded into the tread surface of the sole. Thus, the bottom of the sole has the appearance and feel of rubber or leather.

Although plastic soled shoes with tread inserts have found commercial acceptance, there remains a portion of shoe buyers who prefer the full leather outsole, but prefer, or at least have no objection to, plastic or rubber-bottomed heels. The manufacture of such shoes according to present methods is time consuming and relatively expensive because of the many operations involved, including the several steps required in heeling the shoe, i.e., heel attaching, breasting, trimming, scouring, inking, burnishing and the like.

It is therefore an object of the present invention to provide means for attaching a heel to a leather sole in one step, that is without the necessity of breasting, trimming, scouring, etc.

It is a further object of the invention to provide an injection molding assembly for molding plastic or rubber heels directly onto leather outsoles.

It is a still further object of the invention to provide a mold assembly for the injection molding of heels directly to shoe soles and in which the heel breast wall of the mold cavity is slightly variable in area to accommodate engagement with leather soles of varying configurations.

Still another object of the invention is to provide a heel injection mold assembly which may readily be incorporated into existing injection molding machines without extensive modifications or alterations.

With the above and other objects in view, as will hereinafter appear, the present invention in one aspect contemplates a mold assembly for the injection molding of heels directly onto soled shoe uppers. The assembly comprises a bottom mold member, and a side mold member which forms all of the side of a mold cavity except for the heel breast side. At least the upper part of the heel breast side of the mold comprises a yieldable member. A top mold member comprising a lasted and soled upper mounted on a footform is engageable with the side mold member and the yieldable heel breast mold member to enclose and/or define the mold cavity. The heel breast mold member yields, when engaged by the shank portion of the sole, to conform to the shape of the shank portion, thereby providing a close fit regardless of the variance in the contour of the shank area.

In accordance with a further feature of the invention, there is incorporated in the assembly a pair of welt plates slidable over the side mold member to engage the upper surface of the sole extension in the heel area to prevent its turning upward over the upper material at the heel end of the shoe under mold pressure during an injection operation.

The above and other features of the invention, including various novel details of construction and combinations of parts, will now be more particularly described with reference to the accompanying drawings and pointed out in the claims. It will be understood that the particular assembly embodying the invention is shown by way of illustration only and not as a limitation of the invention. The principles and features of this invention may be employed in various and numerous embodiments without departing from the scope of the invention.

Reference is made to the accompanying drawings in which there is shown an illustrative embodiment of the invention from which its novel features and advantages will be apparent.

In the drawings,

FIG. 3 is an exploded view of the mold assembly.

Figure 1:
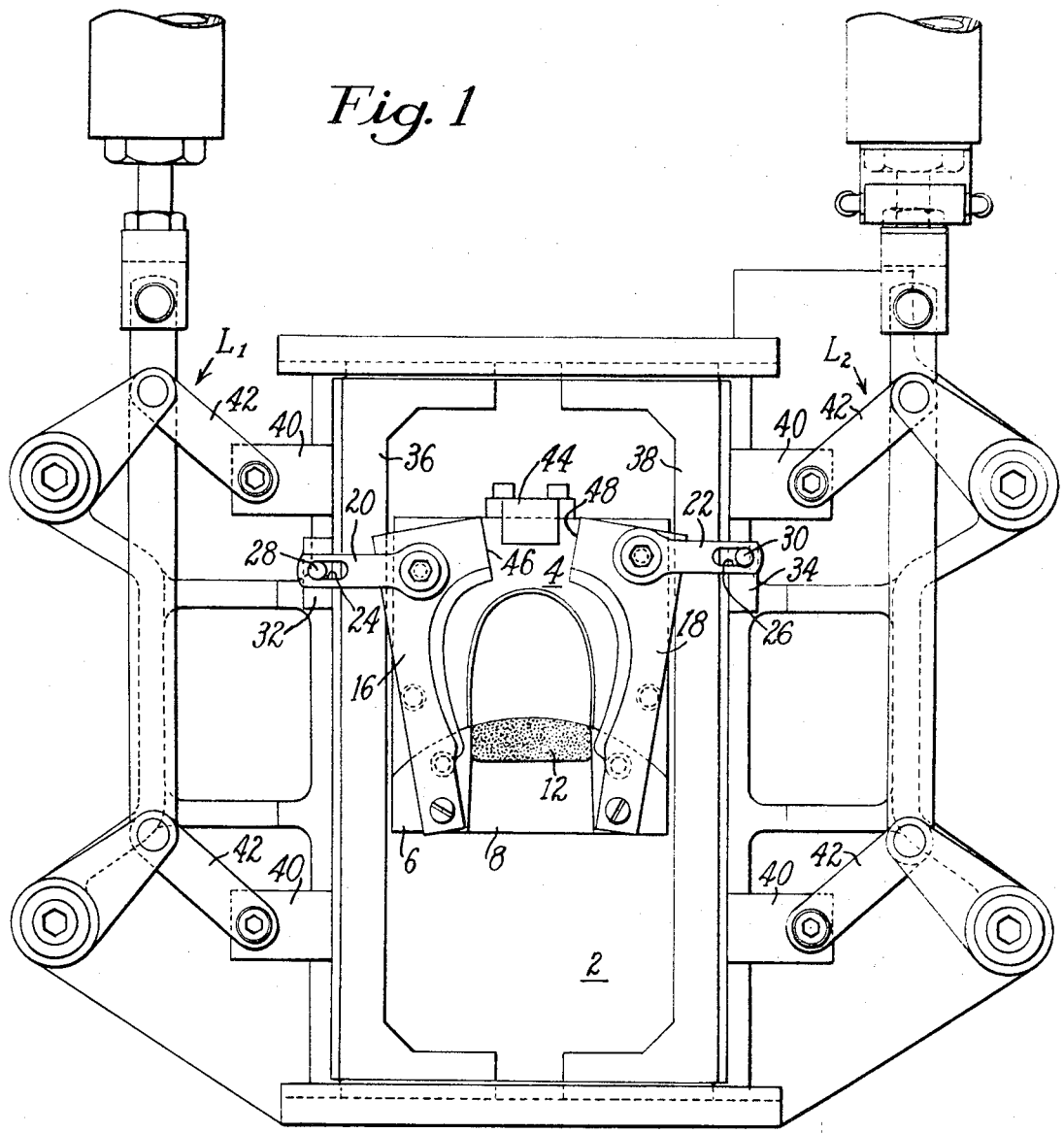
FIG. 1 is a plan view of one form of mold assembly embodying the invention.

Referring to the drawings, it may be seen that the illustrative assembly includes a bottom mold member 2 which forms the bottom wall of a mold cavity and which is adapted to be connected to the particular injection molding machine to be utilized in conjunction with the present invention. The particular bottom mold member shown as an illustrative example is adapted to engage and be affixed to the mold support platen of the injection molding machine shown in U.S. Patent application Ser. No. 452,213, filed Apr. 30, 1965, now Patent No. 3,358,333, in the names of Charles J. Kitchener et al.

Attached to the bottom mold member 2 is a side mold member 4 which constitutes the side wall of the mold cavity, exclusive of the heel breast area. A heel breast mold member 6 is also attached to the bottom mold member and engages the side mold member 4 to form what is essentially an extension of the side mold member. The side mold member 4 and heel breast member 6 may be integral. The heel breast member forms a portion 7 of the heel breast wall of the mold cavity.

The heel breast mold member 6 is provided with a cut-out portion 8 including a recess 10 for receiving a yieldable mold member 12. The yieldable mold member 12 completes the heel breast wall of the mold cavity.

Figure 2:
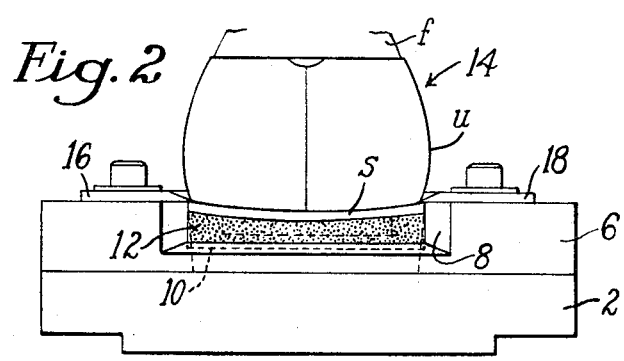
FIG. 2 is a front view of the mold assembly, shown with the mold cavity enclosed.

A top mold member 14 (FIG. 2) is engageable with the side mold member 4 and the yieldable mold member 12 to enclose the mold cavity. The top mold member 14 comprises a lasted shoe upper $u$ mounted on a footform $f$ and having attached thereto an outsole $s$, the bottom of the outsole $s$ actually defining the top of the mold cavity to which the heel will adhere.

Pivotally attached to the heel breast mold member 6 are welt plates 16, 18 which operate to retain the sole $s$ in proper position during a mold charging operation. The free ends of the pivotally anchored welt plates have pivotally attached thereto ends of links 20, 22. The other ends of the links 20, 22 are provided with lost motion slots 24, 26. The slots 24, 26 receive pins 28, 30 (FIG. 1) which are mounted in blocks 32, 34. The blocks 32, 34 may be secured to side mold retaining members 36, 38. The members 36, 38 have lugs 40 fixed thereto, the lugs 40 being connected to ends of links 42 pivotally fixed thereto. Linkage systems L1, L2, including the links 42, are disposed on either side of the assembly and operate substantially as described in the hereinabove mentioned patent application to move the side mold retaining means 36, 38 toward and away from each other.

Attached to the bottom mold member and in engagement with the side mold member is a cam meber 44 having inclined surfaces 45, 47 (FIG. 3). When the welt plates 16, 18 move toward each other, or into the "closed" position, their leading edges 46, 48 engage the inclined surfaces 45, 47 respectively and are caused to pass under the cam member 44 but in engagement therewith, to insure firm anchoring of the welt plates during the molding operation.

The operation of the assembly will now be discussed. An upper $u$ having an attached outsole $s$ and being mounted on a footform $f$ is moved by means known in the art into engagement with the rest of the mold assembly to enclose the mold cavity. The outsole $s$ enters and seals the heel mold cavity. The linkage systems L1, L2 are then operated to move the side mold retaining members 36, 38 toward each other. In the utilization of the present invention the side mold retaining members do not hold the usual side mold members of a sole mold assembly but instead have fixed thereto the blocks 32, 34. As the side mold retaining members 36, 38 approach each other the blocks 32, 34 carrying the pins 28, 30 also approach each other. After the pins 28, 30 have travelled the length of the lost motion slots 24, 26 they cause the links 20, 22 to move toward each other. The length of slots 24, 26 is determined by the spacing of the side closure means of the particular type of injection molding machine utilized in the operation of the present invention. The movement of the links 20, 22 causes pivotal movement of the welt plates 16, 18 with the edges 46, 48 approaching each other. The edges 46, 48 encounter the inclined surfaces 45, 47 of the cam member 44 and subsequently engage each other. At this point the welt plates 16, 18 are disposed upon the periphery of the upper surface of the outsole in the area of the heel to hold the sole in its proper position during a mold charging operation. The cam member 44 insures that the welt plates themselves are securely held down.

The shank portion of the sole $s$ engages the yieldable mold member 12. The mold member 12 is sufficiently deformable to accept various shank configurations and effect a satisfactory seal between the mold member 12 and the sole $s$.

The sole having been locked in position by the welt plates, a molten elastomeric material is then injected into the cavity through a sprue channel (not shown) which may be located in the bottom mold member, the side mold member, the heel breast mold member, or a combination of these. After the heel mold cavity is filled, and after the passage of sufficient cooling time, the linkage systems L1, L2 are caused to separate the welt plates 16, 18 and the upper $u$ with an elastomeric heel molded thereon is separated from the rest of the mold assembly. The heel ordinarily need not be subjected to further operations.

Having thus described our invention what we claim as new and desire to secure by Letters Patent of the United States is:

1. A mold assembly for injection molding of heels onto footwear soles, said assembly comprising a bottom mold member forming the bottom of a mold cavity, at least one side mold member adjacent said bottom mold member and forming the sides of the mold cavity, a top mold member adapted to carry a footwear sole engageable with the side mold member for forming the top of the mold cavity, and a yieldable mold member forming at least a portion of a heel breast side of the mold cavity and engageable by a shank portion of the sole, said yieldable mold member being sufficiently flexible to conform to the contour of said shank when it is engaged by the shank to form an enclosed mold cavity.

2. A mold assembly for injection molding of heels onto soled shoe uppers, said assembly comprising a bottom mold member forming the bottom of a mold cavity, at least one side mold member adjacent said bottom mold member and forming all of the side of the mold cavity except for at least a portion of a heel breast side, a footform carrying a lasted and soled upper engageable with the side mold member for forming the top of the mold cavity, and a yieldable mold member forming at least a portion of the heel breast side of the mold cavity and engageable by a shank portion of the sole of said upper, said yieldable mold member being sufficiently flexible to conform to the contour of said shank when it is engaged by the shank to form an enclosed mold cavity.

3. The invention according to claim 2 having means for engaging the upper surface periphery of the sole to hold the sole in place during a mold charging operation.

4. A mold assembly for injection molding of soles onto soled shoe uppers, said assembly comprising a bottom mold member forming the bottom of a mold cavity, at least one side mold member adjacent said bottom mold member and forming the side mold cavity except for the heel breast side, a footform carrying a lasted and soled upper engageable with the side mold member for forming the top of the mold cavity, a heel breast mold member adjacent said bottom mold member and adjacent said side mold member and forming a portion of the heel breast side of the mold cavity, a yieldable mold member fixed to said heel breast mold member and forming the remainder of the heel breast side of the mold cavity, said yieldable mold member being engageable by a shank portion of the sole of said upper, said yieldable mold member being sufficiently flexible to conform to the contour of said shank when it is engaged by the shank to provide a seal between said shank portion and said yieldable mold member.

5. A mold assembly for the injection molding of heels onto soled uppers, said assembly comprising a bottom mold member forming the bottom of the mold cavity, a side mold member forming the side wall of the mold cavity exclusive of the heel breast wall, a heel breast mold member attached to the bottom mold member and forming an extension of said side mold member and forming a portion of the heel breast wall of the mold cavity, a yieldable mold member attached to said heel breast mold member and forming the remainder of the heel breast wall of the mold cavity, a footform having a soled upper mounted thereon and movable to engage said side mold member and said yieldable mold member to enclose the mold cavity, welt plates mounted on said mold assembly and movable to engage the periphery of the upper surface of the sole in the heel area, said welt plates being adapted to hold the sole in position during a mold charging operation.

6. The invention according to claim 5 including means for holding the welt plates in position during a mold charging operation.

7. A mold assembly for the injection molding of heels onto soled uppers, said assembly comprising a bottom mold member for forming the bottom of a mold cavity, at least one side mold member for forming the sides of the mold cavity, a top mold member adapted to carry a lasted upper with an outsole attached thereto, said top mold member being movable to cause said sole to enter and enclose said mold cavity, a yieldable and flexible mold member forming at least a portion of a heel breast side of the mold cavity and engageable by a shank portion of said sole, and means movable to engage the periphery of the upper surface of said outsole to retain said outsole in position during a mold charging operation.

8. The invention according to claim 7 in which said sole engaging means comprises a pair of welt plates.

9. The invention according to claim 8 in which said welt plates are pivotally mounted, and including means for engaging the free ends of said welt plates for holding said welt plates in position during a mold charging operation.

References Cited

UNITED STATES PATENTS

| | | |
|---|---|---|
| 2,302,342 | 11/1942 | Nast. |
| 2,513,785 | 7/1950 | Browne. |
| 2,734,227 | 2/1956 | Costick et al. |
| 2,820,251 | 1/1958 | Fraser. |
| 2,945,260 | 7/1960 | Bell. |
| 3,056,166 | 10/1962 | Weinberg. |
| 3,173,173 | 3/1965 | Lister. |
| 3,203,049 | 8/1965 | Brown et al. |
| 3,248,758 | 5/1966 | Schmitz et al. |
| 3,314,640 | 4/1967 | Snow. |

J. HOWARD FLINT, Jr., *Primary Examiner.*